Feb. 26, 1929.

M. W. HENRY 1,703,734

PRESSURE DROP ALARM SYSTEM

Filed Nov. 1, 1927    2 Sheets-Sheet 1

INVENTOR.
Murray W. Henry,
BY Geo. P. Kimmel.
ATTORNEY.

Feb. 26, 1929.
M. W. HENRY
1,703,734
PRESSURE DROP ALARM SYSTEM
Filed Nov. 1, 1927   2 Sheets-Sheet 2
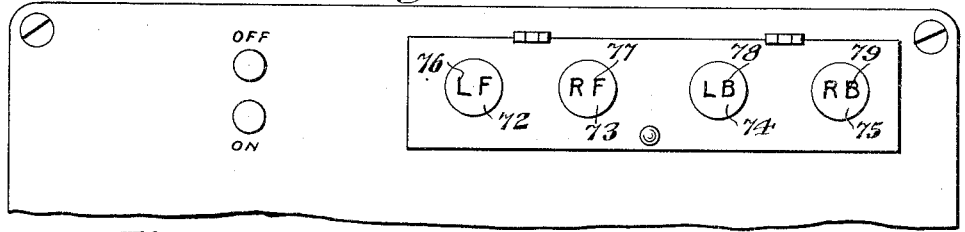
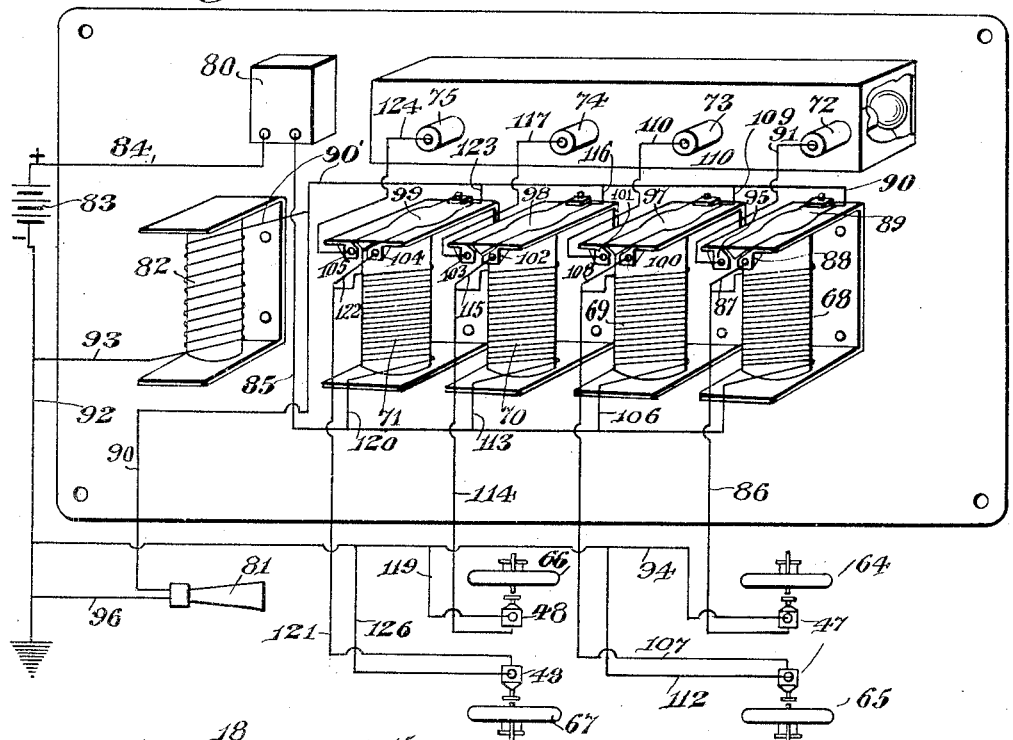
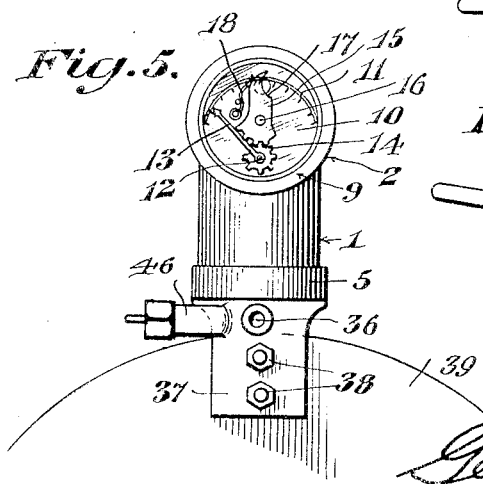
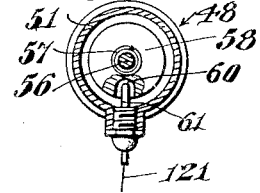
INVENTOR.
Murray W. Henry,
BY
Geo. P. Kimmel. ATTORNEY.

Patented Feb. 26, 1929.

1,703,734

UNITED STATES PATENT OFFICE.

MURRAY W. HENRY, OF SAN ANTONIO, TEXAS.

PRESSURE-DROP ALARM SYSTEM.

Application filed November 1, 1927. Serial No. 230,316.

This invention relates to a pressure drop alarm for pneumatic tires and has for its object to provide, in a manner as hereinafter set forth, an alarm system for use in connection with vehicles having pneumatic tires whereby when the pressure drops to a predetermined point in any tire it will be immediately indicated, as well as the location of the particular tire.

The invention has for its general object to provide an automatic alarm or indicating means of the character referred to which is comparatively inexpensive to manufacture and install, thoroughly reliable and efficient in use and so designed to be easily and conveniently installed and manipulated.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 3 is a diagrammatic view of the system as applied to the four wheels of the vehicle.

Figure 4 is a fragmentary view illustrating the indicating means.

Figure 5 is a front elevation of a pressure controlled operating mechanism for the circuit opening and closing device and further illustrating the pressure gauge.

Figure 6 is a vertical sectional view of the circuit opening and closing device.

Figure 7 is a detail illustrating the operating rod for the pressure gauge and circuit opening and closing device.

Figure 1:
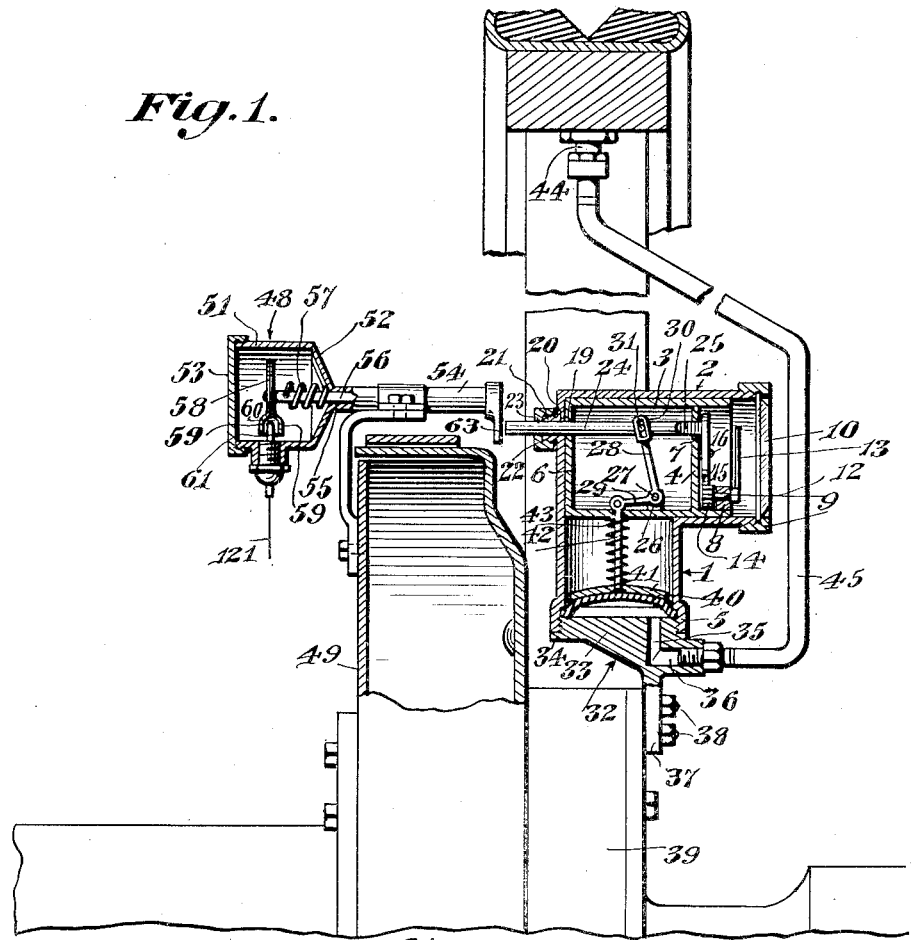
Figure 1 is a vertical sectional view of a circuit opening and closing device and the pressure controlled operating mechanism therefor as applied to a rear wheel of a vehicle.
Figure 2:
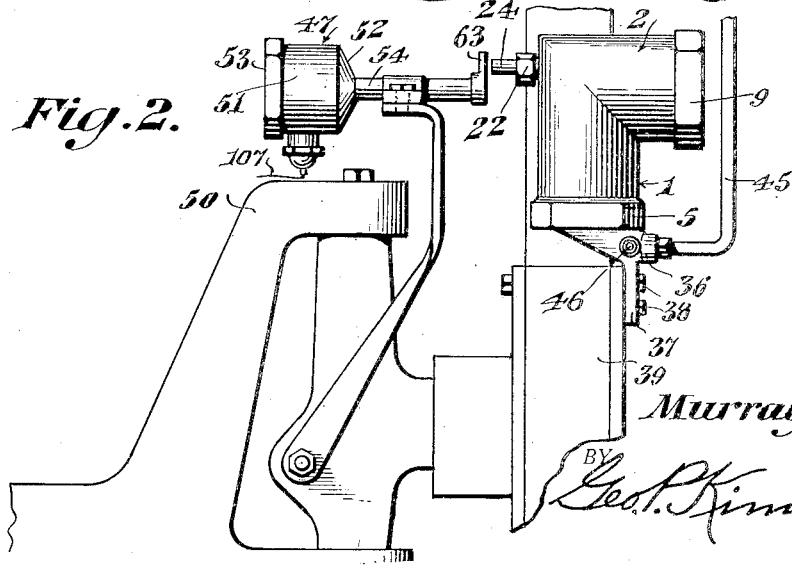
Figure 2 is an elevation of the circuit opening and closing device and the pressure controlled operating mechanism therefor as applied to a front wheel of the vehicle.

The pressure controlled operating mechanism for the circuit opening and closing device comprises an angle shaped housing formed of a vertical tubular leg 1 and a horizontal tubular leg 2 projecting outwardly from the upper end of the leg 1. Arranged within the leg 2 and extending across the upper end of the leg 1 is a cylinder 3 provided with a partition 4. The leg 1 is open at its top and bottom and is offset at its lower end as at 5. The leg 2 is open at its outer end. The partition 4 is arranged within the cylinder 3 a substantial distance from the outer end thereof. The rear end of the cylinder 3 is closed as at 6. The partition 4 corresponds in contour to the inner contour of the cylinder 3 and is integral with the inner face of the latter. The partition 4 is formed at its vertical median above its axis with an opening 7. Formed integral with the bottom of the inner face of the cylinder 3 and arranged forwardly of and spaced from the partition 4 is an apertured lug or bearing 8. Positioned against the outer edge of the leg 2 and secured thereagainst by a clamping band 9 is a transparent member or glass 10 corresponding in contour to the shape of the leg 2. The forward face of the partition 4 is provided with a pressure indicating scale 11 arranged in the form of an arc. Journaled in the lug 8 is a shaft 12 provided on its outer end with an upstanding pointer 13 which coacts with the scale 11. The inner end of the shaft 12 carries a small pinion 14 which meshes with a toothed quadrant 15 pivotally mounted on a stub shaft 16 carried by the partition 4 at the axis thereof. The quadrant 15 has a curved tapered extension 17 at its top which projects across the opening 7. A leaf spring 18 is secured to the partition 4 and bears against the quadrant 15 for normally maintaining the extension 17 to project across the front of the opening 7.

The closed end 6 of the cylinder 3 is formed with an opening 19 which registers with an opening 20 formed in the closed inner end of the leg 2. Integral with the outer face of the closed inner end of the leg 2 is a peripherally threaded collar 21 which registers with the opening 20. An interiorly threaded cap 22 is secured to the collar 21 and is formed with an opening 23. Extending through the opening 7 and also through the registering openings 19, 20, 22 and collar 21 is a longitudinally shiftable operating rod 24, having a beveled forward end 25 adapted to ride against a side edge of the extension 17 for the purpose of shifting the quadrant 15 whereby the teeth of the latter will engage the pinion 14 and rotate the latter, under such conditions shifting the shaft 12 and carrying the pointer 13 therewith across the scale. The shifting of the quadrant 15 is had against the action of its spring 18. When the quarant 15 is shifted by the shaft 24 the pointer 13 will move in a clockwise direction and when shifted by its spring 18 the pointer 13 will move in an anti-clockwise direction. The means for shifting the rod 24 forwardly and rearwardly will be presently referred to.

Formed integral with the bottom of the inner face of the cylinder 3, rearwardly of the partition 4, is an apertured lug 26 to which a bell crank lever is pivoted, as at 27. The lever includes an upstanding arm 28 and a horizontally disposed arm 29. The arm 28 is provided with an integral slotted link 30 at its upper end through which extends a lateral pin 31 carried by the rod 24.

Secured in the offset portion of the leg 1 is a combined closure and supporting element therefor referred to generally at 32. The element 32 comprises a body portion 33 having an annular flange 34 abutting against the edge of the offset portion 5. The body portion 33 is formed with peripheral threads which engage with interior threads formed on the offset portion 5. The body portion 33 is provided with a port consisting of a vertically disposed branch 35 and a horizontally disposed branch 36. The branch 35 opens into the leg 1 and at its lower end opens into the inner end of the branch 36. The body portion 33 is provided with a depending arm 37, through which extend holdfast devices 38 for securing said arm to the hub 39 of a wheel.

Arranged within the lower end of the leg 1 and having its edge bearing against the body portion 33 is an inverted cup shaped resilient diaphragm 40. Positioned upon the diaphragm 40 is a spring controlled piston head 41, having an upstanding rod 42, which extends through an opening 43 formed in the cylinder 1. The rod 42 terminates at its upper end in the outer end of the arm 29 of the bell crank. Surrounding the rod 42 and interposed between the cylinder 3 and the piston head 41 is a controlling spring 43 for the latter.

Extending from the branch 36 of the port or passage formed in the body portion 33 to the filler stem 44 of the tire is an air conducting pipe 45 for supplying pressure to the diaphragm 40, which in turn will elevate the piston 41, against the action of the spring 43, and on the elevation of the piston 40, the bell crank will be shifted in a direction whereby the arm 28 thereof will move the rod 24 forwardly and provide for the actuation of the quadrant 15 against the action of its controlling spring 18. When pressure is reduced against the diaphragm 40, the bell crank, due to the action of the spring 43 and diaphragm 40, will be shifted in the opposite direction whereby the arm 28 will move rearwardly, carrying the rod 24 therewith and on the rearward movement of the rod 24, it will be positioned to engage and operate the circuit opening and closing device to be presently referred to.

The housing 1 at its lower end is provided with means, as indicated at 46 for the purpose of filling the tire without disconnecting the pipe 45.

The circuit opening and closing devices employed in connection with the front wheels are generally indicated at 47 and the circuit opening and closing devices employed in connection with the rear wheels are generally indicated at 48. The circuit opening and closing devices 48 are supported from the rear axle housing 49 and the circuit opening and closing devices 47 are supported from the spindle of axle 50.

Each circuit closing and opening device includes a casing 51 provided with a conoidal shaped outer end 52 and an open inner end closed by a flanged cap 53 which threadedly engages with the body of the casing 51. Formed integral with the end 52 of the casing 51 is a sleeve 54, which registers with an opening 55 formed in said end 52. Journaled in the sleeve 54 and projecting forwardly and rearwardly therefrom and also extending into the casing 51 is a rock shaft 56 carrying on that part thereof which is arranged within the casing 51 a controlling spring 57. One end of the spring 57 is fixed to the end 52 of the casing 51 and the other end is fixed to the shaft 56. That end of the shaft 57 positioned in the casing 51 has fixed thereto a circuit opening and closing member 58 for a relay circuit to be hereinafter referred to. The circuit opening and closing member 58 is in the form of a pair of discs of conducting material, offset at the lower portion thereof in opposite directions, offset, as at 59 with respect to each other to provide a recess 60 of substantial width and length and into which extends a contact terminal 61 adapted to be engaged by the member 58 for the purpose of closing the circuit.

The shaft 56 of the circuit opening and closing devices 47 has its outer end provided with an upstanding crank arm 62 engaged by the rod 24, when the latter is shifted rearwardly, for the purpose of shifting the shaft 56 against the action of its controlling spring 57 to move the contact member 58 into engagement with the contact terminal 61 to close the relay circuit.

The shaft 56 of the circuit opening and closing devices 48 has its outer end provided with a depending crank arm 63 adapted to have the rod 24, when the latter is shifted rearwardly, ride thereagainst for the purpose of shifting the shaft 56 against the action of its controlling spring 57 to move the contact member 58 to engagement with the contact terminal 61 to close the relay circuit. The controlling springs 57 normally maintain the circuit opening and closing members 58 clear of the contact terminals 61 whereby the relay circuits are normally open. The circuit opening and closing devices 47 are supported on the spindle of the axle 50. The circuit opening and closing devices 48 are mounted on rear axle housing adjacent to wheel and are stationary.

With reference to Figure 3, which illustrates the system diagrammatically, the front wheels of the vehicle are indicated at 64, 65 and the rear wheels at 66, 67. Associated with each front wheel is a circuit opening and closing device 47 and associated with each rear wheel is a circuit opening and closing device 48. An electrically operated combined indicating and signalling mechanism is employed for not only indicating which of the tires of the vehicle has a reduction of pressure therein but also for signalling such fact. The signal is common to the several tires, but a separate indicator is employed for each tire. The mechanism is positioned in a manner so that it can be conveniently viewed by the driver of the vehicle and it includes four relays 68, 69, 70 and 71 associating respectively with the wheels 64, 65, 66 and 67. Associated with the wheels 64, 65, 66, 67, through the relays 68, 69, 70 and 71, respectively, are indicators 72, 73, 74 and 75 respectively. Each indicator is in the form of a lamp having associated therewith designating means for the wheels such as left front, right front, left back and right back and as shown the indicator for left front is indicated at 76 and consists of the letters L F. The indicator for right front is designated 77 and consists of the letters R F. The designation left back is indicated at 78 and consists of the letters L B and the indicator or designator right back is indicated at 79 and consists of the latters R B. The mechanism further includes a circuit breaker 80. The signal or alarm, which is illustrated in the form of a horn, is indicated at 81. The mechanism further includes a resistance 82. A source of electrical supply is indicated at 83.

The circuit connections include a circuit conductor 84 leading from the battery 83 to the circuit breaker 80. A circuit conductor 85 leading from the circuit breaker 80 to the relay 68. A circuit conductor 86 leading from the relay 68 to the contact terminal 61 which associates with the circuit opening and closing device for the wheel 64. A circuit conductor 87 leading from the conductor 86 to the contact 88. A contact member 89 carried by the core of relay 68. A circuit connection 90 between the contact member 89 and the horn 81. A circuit connection 90' between conductor 90 and resistance 82. A circuit connection 91 between the indicator 72 and a contact 95 which associates with the contact member 89. A circuit conductor 92 leading from the battery 83 to the ground. A circuit connection 93 between the resistance 82 and the conductor 92, a circuit conductor 94 leading from the circuit opening and closing device 47 for the wheel 64 to the conductor 92. A circuit conductor 96 leading from the horn 81 to the conductor 92. When the circuit is closed by the circuit opening and closing device 47, which associates with the wheel 64, the relay 68 will be energized, whereby the contact member 89 will be shifted by the relay to engage the contacts 88 and 95. Under such conditions the indicator 72 will be operated as well as the horn 81.

Operated from the core of relay 69 is a contact member 97. Operated from the core of the relay 70 is a contact member 98 and operated from the core of the relay 71 is a contact member 99. Associated with the contact member 97 is a pair of contacts 100 and 101. Associated with the contact member 98 is a pair of contacts 102 and 103, and associated with the contact member 99 is a pair of contacts 104, 105.

Extending from the circuit conductor 85 to the relay 69 is a circuit connection 106. Extending from the relay 69 to the contact terminal 61 of the circuit opening and closing device 47 which associates with a wheel 65 is a circuit conductor 107. Extending from the conductor 107 to the contact 100 is a circuit connection 108. A circuit connection 109 extends from the contact member 97 to the conductor 90. Extending from contact 101 to indicator 73 is a circuit connection 110. Extending from the circuit opening and closing device 47 which associates with the wheel 65 to the conductor 94 is a circuit connection 112.

Extending from the conductor 85 to the relay 70 is a circuit connection 113 and extending from the circuit opening and closing device 48 which associates with the wheel 66 and leading to the relay 70 is a circuit conductor 114. Extending from the conductor 114 to the contact 102 is a circuit connection 115. Extending from the contact member 98 to the conductor 90 is a circuit connection 116 and extending from the contact 103 to the indicator 74 is a circuit connection 117. Extending from the circuit opening and closing device 48 which associates with the wheel 66 to the conductor 94 is a circuit connection 119.

Extending from the circuit conductor 85 to the relay 71 is a circuit connection 120 and extending from the relay 71 to the circuit opening and closing device 48 which associates with the wheel 67 is a circuit conductor 121. Leading from the circuit conductor 121 to the contact 104 is a circuit connection 122. Extending from the contact member 99 to the conductor 90 is a circuit connection 123 and extending from the contact 105 to the indicator 75 is a circuit connection 124. Extending from the circuit opening and closing device which associates with the wheel 67 to the conductor 94 is a circuit connection 126.

When the circuit opening and closing device 47, which associates with the wheel 64 is operated to close the circuit, the circuit for the relay 68 would be closed as well as the circuit for the indicator 72 and the horn 81. The circuit for the relay 68 and indicator 72 are closed independently of the other relay and indicator circuits. When the circuit opening and closing device 47, which associates with the wheel 65, is operated, to close the circuit, the circuit for the relay 69 will be closed as well as the circuit for the indicator 73 and also the circuit for the horn 81, but the closing of the relay circuit and indicator circuit 69, 73 respectively is had independently of the other circuits with the exception of the circuit to the horn 81. The horn circuit is closed when any one of the relay circuits is closed. The circuit for the relay 70 is closed when the circuit opening and closing device 48 which associates with the wheel 66 is operated to close such circuit and on the closing of the relay circuit 70, the circuit for the indicator 74 will be closed, but the closing of such circuits will be independent of the other relay and indicator circuits. On the closing of the circuit for the relay 70 the horn will be sounded as its circuit will be closed. The closing of the circuit for the relay 71 is had when the circuit opening and closing device 48 which associates with the wheel 67 is operated to close such circuit and on the closing of such circuit for the relay 71 the circuit for the indicator 75 will be closed and such circuits will be closed independently of the other relay and indicator circuits, but the horn circuit will be closed with the closing of the relay circuit 71.

It is thought the many advantages of a pressure drop alarm for pneumatic tires in accordance with this invention, can be readily understood, and although the preferred embodiment of the invention is as illustrated and described, yet it is to be understood that changes in the details of construction can be had which fall within the scope of the invention as claimed.

What I claim is:

1. In a pressure drop alarm system for pneumatic tires and of that type including an electrically operated indicator, the combination of a spring controlled circuit opening and closing device for the indicator circuit normally held in circuit opening position, and a tire pressure controlled operating mechanism for said device including a reciprocatory rod for operating said device against the action of its controlling spring on a reduction of pressure in the tire when said rod moves in one direction, said mechanism including means for establishing communication therebetween and the tire and further including a spring controlled tire pressure indicating gauge operated against the action of its controlling spring by said rod when the latter moves in the opposite direction.

2. In a pressure drop alarm system for pneumatic tires and of that type including an electrically operated indicator, the combination of a spring controlled rock shaft carrying respectively a crank arm and an indicator circuit opening and closing member spaced from the crank arm, and a tire pressure controlled operating mechanism for said device and including a reciprocatory rod for engagement with said crank arm for rocking said shaft against the action of its controlling spring on the reduction of pressure in the tire to position said member to close the indicator circuit.

3. In a pressure drop alarm system for pneumatic tires and of that type including an electrically operated indicator, the combination of a spring controlled rock shaft carrying respectively a crank arm and an indicator circuit opening and closing member spaced from the crank arm, tire pressure controlled operating mechanism for said device and including a reciprocatory rod for engagement with said crank arm for rocking said shaft against the action of its controlling spring on the reduction of pressure in the tire to position said member to close the indicator circuit when said rod moves in one direction, said mechanism further including a tire pressure indicating gauge operated by said rod when the latter moves in the opposite direction.

4. In a pressure drop alarm system for pneumatic tires and of that type including an electrically operated indicating means normally in an open circuit, the combination of a circuit opening and closing device for said circuit, said device being spring controlled and normally held in circuit opening position, and a tire pressure controlled operating mechanism for said device and including a reciprocatory rod movable in one direction for operating said device against the action of its controlling spring on a reduction of tire pressure to close the indicating means circuit, said mechanism further including a piston operated spring controlled bell crank for operating said rod, and said mechanism further including a spring controlled tire pressure indicating gauge operated by said rod when the latter moves in the other direction.

In testimony whereof, I affix my signature hereto.

MURRAY W. HENRY.